(12) United States Patent
Garinger et al.

(10) Patent No.: US 7,771,257 B1
(45) Date of Patent: Aug. 10, 2010

(54) DEVICE TO FACILITATE HOG HEAD REMOVAL

(75) Inventors: Patrick Garinger, Bourbounais, IL (US); Dan Sambrooks, Momence, IL (US); David H. Slayton, Momence, IL (US); Edward Petras, Kankakee, IL (US)

(73) Assignee: Momence Packing Co., Momence, IL (US)

( * ) Notice: Subject to any disclaimer, the term of this patent is extended or adjusted under 35 U.S.C. 154(b) by 0 days.

(21) Appl. No.: 12/455,113

(22) Filed: May 28, 2009

(51) Int. Cl.
*A22C 18/00* (2006.01)
(52) U.S. Cl. ..................................................... 452/168
(58) Field of Classification Search .................... 452/63, 452/64, 125, 128, 132, 133, 166–168
See application file for complete search history.

(56) References Cited

U.S. PATENT DOCUMENTS

| | | | |
|---|---|---|---|
| 2,994,908 A | 8/1961 | Fill | |
| 3,461,482 A * | 8/1969 | Bajcar et al. | 452/128 |
| 3,990,126 A | 11/1976 | Ochylski | |
| 4,092,762 A | 6/1978 | Ochylski | |
| 4,158,903 A | 6/1979 | Ochylski | |
| 4,299,009 A * | 11/1981 | Tournier | 452/128 |
| 4,438,546 A * | 3/1984 | Couture | 452/128 |
| 5,139,457 A | 8/1992 | Rankin et al. | |
| 5,405,290 A * | 4/1995 | Chuang | 452/136 |
| 6,776,701 B2 | 8/2004 | Fryer | |

* cited by examiner

*Primary Examiner*—Thomas Price
(74) *Attorney, Agent, or Firm*—Carmen Patti Law Group, LLC

(57) ABSTRACT

A device for the clean removal of an animal part from an animal carcass is set forth. The device includes a puller that attaches to the animal part and to a cable. A piston is also provided. The piston is connected to the cable that pulls the part away from the animal carcass via the cable and the puller, and applies pressure to dislocate the bones from the animal carcass. The bones are dislocated without removing the dislocated section completely from the animal carcass.

20 Claims, 3 Drawing Sheets

DEVICE TO FACILITATE HOG HEAD REMOVAL

CROSS-REFERENCE TO RELATED APPLICATION

None.

BACKGROUND

The tradition of slaughtering animal meat goes back thousands of years. Many cultures developed special customs surrounding the butchering and storing of precious meat for the winter days. The customs extended into the serving of special holiday meats, such as the Christmas ham, set aside at the yearly slaughter festival.

In modern times, meat processing plants provide a year round source for fresh meat while eliminating the hunting, cleaning, and storing work involved in bringing the meat to the table for consumers.

Inherent in the mass processing of animal meats are problems related to quality. For example, speeding up a production line can present problems when automated tools are not adjusted to meet the dimensional requirements of individual carcasses. Having an individual manually handle each butchering step is costly and inefficient.

For example, manual removal of animal heads requires separating the head from the atlas joint, and is performed by a butcher. The operation of manually separating the head from the atlas joint is difficult and physically taxing due to the amount of force required to separate the head from the neck.

In an effort to speed up production various systems have been developed for automatically removing the head from the hog using a downward force. Examples can be seen in U.S. Pat. Nos. 3,990,126; 4,158,903; and 4,092,762 to Ochylski. Alternatively, a hog head can be removed using a vertical force as discussed, for example, in U.S. Pat. No. 2,994,908 to Fill. These automated methods completely remove the animal head from the carcass. Such methods, however, leave bone chips, presenting a quality control problem.

U.S. Pat. No. 5,139,457 to Rankin et al. provides an apparatus wherein the head of a carcass is pulled to spread the atlas joint before cutting. Proof of the neck stretching is provided by a reaction sensor. U.S. Pat. No. 6,776,701 discusses an apparatus for removing a partially severed head from a hog using a pivot saw assembly.

However, all of the known automated systems fail to maximize the meat available using a quality cutting without bone chips while minimizing the cost of the head removal step in the butchering process.

SUMMARY

In accordance with the principles of the present invention a device for the clean removal of an animal part from an animal carcass is provided. The device includes a puller that attaches to the animal part and to a cable. A piston is also provided. The piston is connected to the cable that pulls the part away from the animal carcass via the cable and the puller, and applies pressure to dislocate the bones from the animal carcass. The bones are dislocated without removing the dislocated section completely from the animal carcass.

A method of removing a head from a hog carcass is also provided. The method includes the following steps: hooking a puller into the head of the hog, actuating a piston connected to the puller via a cable threaded around at least one pulley, thereby dislocating the head of the hog from a spine of the hog, and removing the puller from the head of the hog.

BRIEF DESCRIPTION OF THE DRAWINGS

Embodiments of the invention are illustrated by way of example, and not by way of limitation, in the figures of the accompanying drawings and in which like reference numerals refer to similar elements and in which.

DETAILED DESCRIPTION

Figure 1:
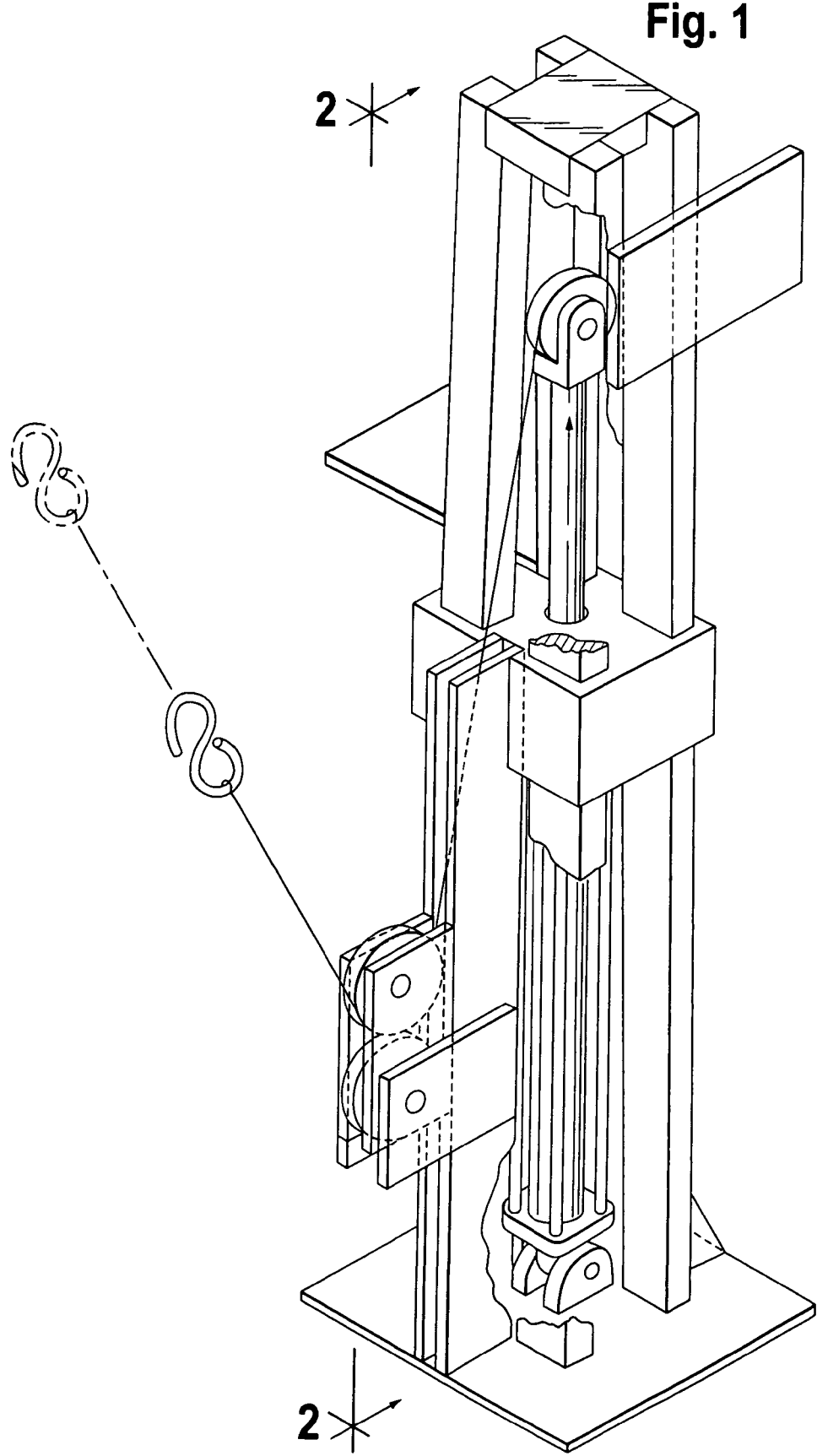
FIG. 1 illustrates a side elevational view, partially broken away, of an embodiment of a device constructed in accordance with the principles of the present invention.

In the following description, specific details are set forth in order to provide a thorough understanding of the invention. However, it will be apparent that the invention may be practiced without these specific details. Without departing from the generality of the invention disclosed herein and without limiting the scope of the invention, the discussion that follows will refer to the invention as depicted in the drawings.

An embodiment in accordance with the principles of the present invention is shown in FIG. 1. One embodiment of a device constructed in accordance with the principles of the present invention is illustrated generally at 10. The device 10 includes a suitable puller, such as hook 12. Any suitable puller can be employed to dislocate an animal part, such as a ring, loop, or any other suitable pulling element. Further, the puller can be formed of any suitable material for food contact, such as an easily cleanable, durable material that can withstand the force applied by the device 10 on the puller.

The puller, such as hook 12 illustrated in FIG. 1 is securely connected to a cable 14. The cable 14 is connected to piston 16 via a series of pulleys 18, 20, and 22. The cable 14 can be formed using a suitable material, such as braided metal cable. Further, the cable 14 can include separate sections joined together to improve the strength of the overall cable, such as a chain link section connected to a braided medal cable.

The piston 16 is connected to the hook 12 at the end of cable 14 via a series of pulleys 18, 20, and 22. A suitable piston 16, such as a hydraulic or pneumatic piston can be provided. An expansion tank 24 for the piston can be provided. The expansion tank 24 functions in a hydraulic or pneumatic system in a conventional manner. A hydraulic or pneumatic valve 26 is also provided, and is operatively connected to the piston 16. The valve 26 includes a lever actuator 28. When an animal carcass to be processed is forwarded via overhead rail, the device 10 can be positioned such that each carcass of the rail comes into contact with and actuates the lever actuator 28.

Pulleys 20, 22 are disposed above the piston 16 within a suitable frame 30. The frame is also formed of a suitable food contact material, such as stainless steel, to ensure appropriate safety regarding cleaning the frame to remove processing fluids from the area. A suitable bracket 32 is connected to the frame at a height suitable for achieving appropriate pressure for dislocating the animal part given the angle determined by the pulley 18 and the frame 30. Where the animal being processed is a hog, a suitable angle can include, for example, an acute angle between the cable 14 outside the frame 30 and the frame 30 exterior.

Figure 2:
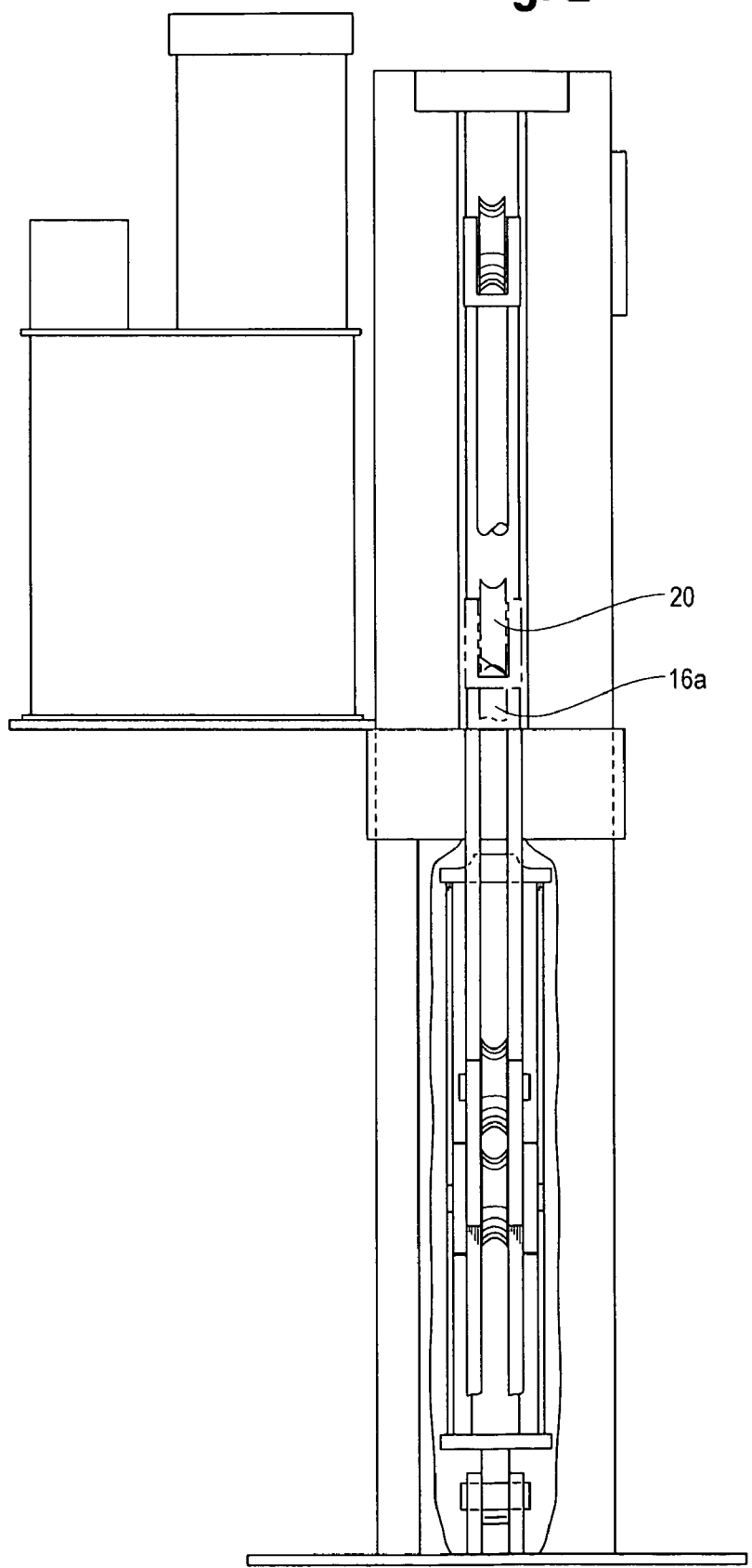
FIG. 2 illustrates a front elevational view, partially broken away of the embodiment of FIG. 1.
Figure 3:
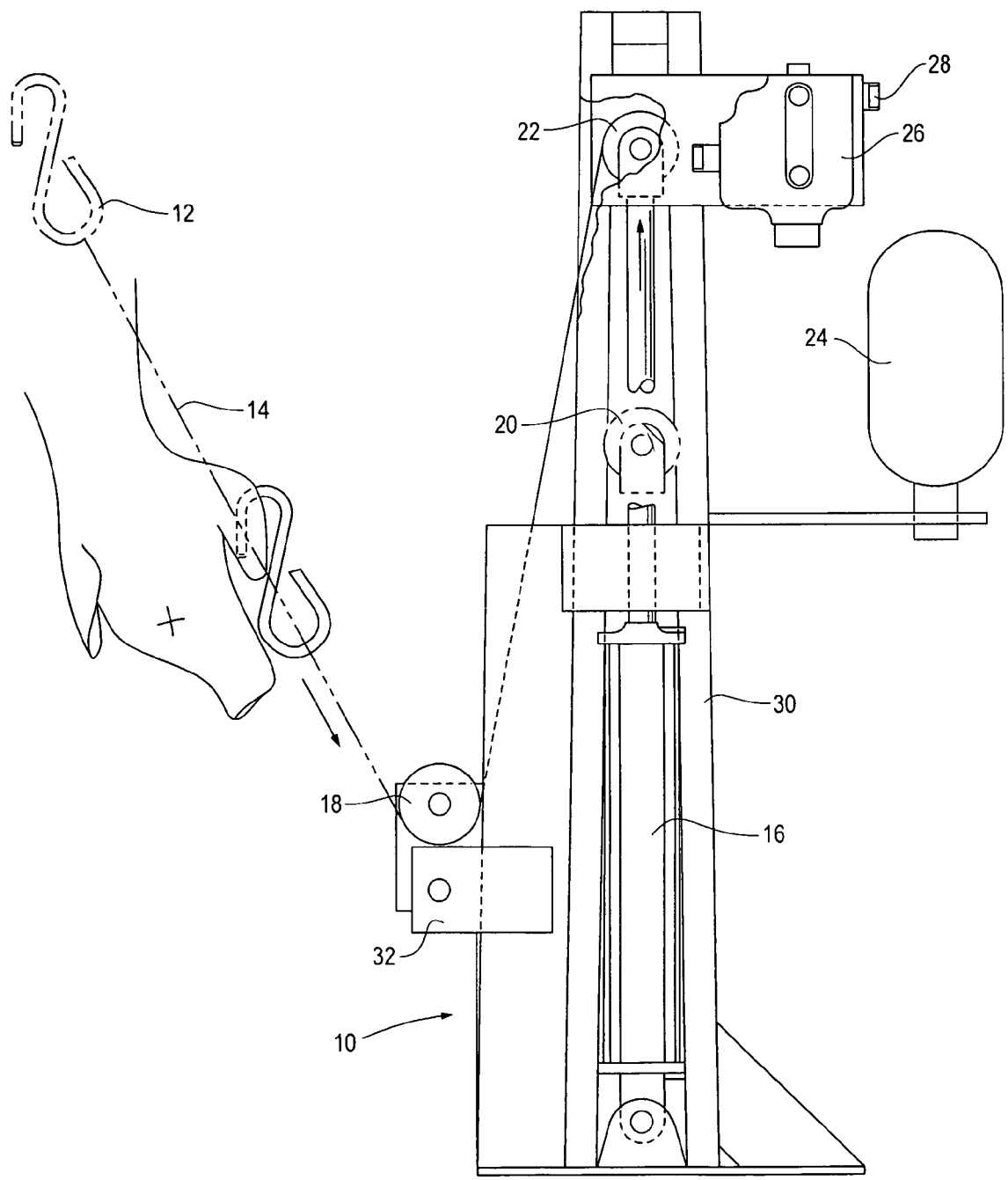
FIG. 3 illustrates a detailed view taken along lines III-III of FIG. 1.

As illustrated in FIG. 2, the pulley 20 is connected to a piston rod 16a of the piston 16. The hook 14 can be connected, for example, to a head of a hog 34, as illustrated in FIG. 3. Actuation of the lever 28 exerts a force on the cable 14 to pull hog head 34 down. This action separates the neck vertebrae of the hog without severing the head from the body. The neck can then be manually cut between the vertebrae, which minimizes the likelihood of creating bone chips.

The device 10 can also be used, for example, to remove other extremities, such as legs, by separating the joints as well.

While this invention has been described in connection with the best mode presently contemplated by the inventor for carrying out his invention, the preferred embodiments described and shown are for purposes of illustration only, and are not to be construed as constituting any limitations of the invention. Modifications will be obvious to those skilled in the art, and all modifications that do not depart from the spirit of the invention are intended to be included within the scope of the appended claims. Those skilled in the art will appreciate that the conception upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

The invention resides not in any one of these features per se, but rather in the particular combinations of some or all of them herein disclosed and claimed and it is distinguished from the prior art in these particular combinations of some or all of its structures for the functions specified.

With respect to the above description then, it is to be realized that the optimum dimensional relationships for the parts of the invention, including variations in size, materials, shape, form, function and manner of operation, assembly and use, and all equivalent relationships to those illustrated in the drawings and described in the specification, that would be deemed readily apparent and obvious to one skilled in the art, are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim as our invention:

1. A device for the clean removal of an animal part from an animal carcass comprising:
   a puller that attaches to the animal part and to a cable; and
   a piston, connected to the cable, adapted and constructed for selectively providing tension force to the puller via the cable, the tension force being sufficient to pull and dislocate the part via the cable and the puller, wherein the bones are dislocated without removing the dislocated section completely from the animal carcass, and wherein the part can be subsequently removed from the carcass without crushing bone.

2. A device as claimed in claim 1, further comprising a series of pulleys provided between the piston and the hook, wherein the cable glides along the pulleys.

3. A device as claimed in claim 2, wherein the piston, cable and pulleys are housed in the frame.

4. A device as claimed in claim 3, further comprising a bracket connected to the frame, wherein one of the pulleys is secured to the bracket.

5. A device as claimed in claim 1, wherein the piston is further defined by a pneumatic piston.

6. A device as claimed in claim 5, further comprising a pneumatic valve operatively connected to the pneumatic piston.

7. A device as claimed in claim 6, further comprising an expansion tank operatively connected to the pneumatic valve.

8. A device as claimed in claim 6, further comprising a lever for selectively actuating the pneumatic valve.

9. A device as claimed in claim 8, further comprising a piston rod, wherein at least one of the pulleys is attached to the piston rod.

10. A device as claimed in claim 1, wherein the piston is further defined by a hydraulic piston.

11. A device as claimed in claim 10, further comprising a hydraulic valve operatively connected to the hydraulic piston.

12. A device as claimed in claim 11, further comprising a lever for selectively actuating the hydraulic valve.

13. A device as claimed in claim 1, wherein the puller is a hook.

14. A device as claimed in claim 1, wherein both a vertical and a horizontal force are applied to the puller via the cable and the piston to create the pressure necessary to dislocate the animal part.

15. A device as claimed in claim 1, wherein the animal carcass is further defined by a hog carcass, and wherein the animal part is further defined by a hog head.

16. A method of removing a head from an animal carcass comprising the steps of:
   hooking a puller into the head of the animal;
   actuating a piston connected to the puller via a cable threaded around at least one pulley, thereby dislocating the head of the animal from a spine of the animal wherein the dislocated head remains connected to the animal carcass, and wherein the dislocated head can subsequently be removed without crushing bone; and
   removing the puller from the head of the animal.

17. A pressure puller for processing animal carcasses comprising:
   a puller selectively connected to an animal part for applying pressure to dislocate the animal part from a carcass;
   a piston provided within a frame for selectively actuating a cable connected to the puller and to the piston;
   at least one pulley disposed above the piston in the frame for guiding the cable within the frame; and
   a bracket connected to the frame for housing another pulley, wherein the height of the bracket is selected to facilitate applying pressure to dislocate the animal part from the carcass via the puller when the cable is actuated, and wherein a force to dislocate the animal part from the carcass is applied by the pressure puller.

18. A pressure puller as claimed in claim 17, further comprising a pneumatic valve having an actuating lever, for selectively actuating the piston.

19. A pressure puller as claimed in claim 17, wherein the puller is further defined by a hook.

20. A pressure puller as claimed in claim 17, wherein the cable is actuated at an acute angle relative to the frame.

* * * * *